(12) United States Patent
Kraft

(10) Patent No.: US 8,038,879 B2
(45) Date of Patent: Oct. 18, 2011

(54) FLUID STRAINER ASSEMBLY

(76) Inventor: Wayne Kraft, Littleton, CO (US)

( * ) Notice: Subject to any disclaimer, the term of this patent is extended or adjusted under 35 U.S.C. 154(b) by 764 days.

(21) Appl. No.: 11/873,117

(22) Filed: Oct. 16, 2007

(65) Prior Publication Data

US 2008/0099392 A1 May 1, 2008

Related U.S. Application Data

(63) Continuation of application No. 10/264,399, filed on Oct. 3, 2002, now Pat. No. 7,282,142.

(60) Provisional application No. 60/374,473, filed on Apr. 22, 2002.

(51) Int. Cl.
*E02B 15/00* (2006.01)
*B01D 35/28* (2006.01)
*B01D 25/02* (2006.01)
*B01D 29/11* (2006.01)
*B01D 29/00* (2006.01)

(52) U.S. Cl. .......... 210/340; 210/97; 210/110; 210/453; 210/162; 210/163; 210/168; 210/169; 210/238; 210/322; 210/452; 210/470; 210/498; 210/446; 210/447; 210/448; 210/323; 210/323.1; 210/170; 210/154; 210/155; 210/170.03

(58) Field of Classification Search .................. None
See application file for complete search history.

(56) References Cited

U.S. PATENT DOCUMENTS

| | | | | | |
|---|---|---|---|---|---|
| 4,652,368 | A | * | 3/1987 | Ennis et al. | 210/97 |
| 4,728,422 | A | * | 3/1988 | Bailey | 210/314 |
| 5,452,546 | A | * | 9/1995 | Goddard | 52/12 |
| 5,562,819 | A | * | 10/1996 | Turner et al. | 210/85 |
| 5,810,999 | A | * | 9/1998 | Bachand et al. | 210/206 |
| RE36,913 | E | * | 10/2000 | Ferraro | 210/167.12 |
| 6,238,563 | B1 | * | 5/2001 | Carroll et al. | 210/605 |
| 6,379,541 | B1 | * | 4/2002 | Nicholas | 210/155 |
| 6,478,954 | B1 | * | 11/2002 | Turner et al. | 210/162 |

* cited by examiner

*Primary Examiner* — Krishnan S Menon
(74) *Attorney, Agent, or Firm* — McDermott Will & Emery LLP

(57) ABSTRACT

A fluid strainer device is disclosed. The device includes a housing which defines an open chamber, the chamber having both at least one fluid input port and at least one fluid outlet port. A plurality of spaced strainer baskets are disposed within the chamber. Each basket has a pair of spaced perforated side panels, a perforated rear panel, a perforated top panel and an open front portion in fluid communication with the chamber fluid input port. Finally, each strainer basket is aligned within the chamber for fluid flow from the chamber input port into the basket's open front portion and out through the perforations thereof to filter debris from the fluid while preventing substantial fluid pressure drop between the input and outlet ports substantially independent of debris buildup within the basket.

38 Claims, 6 Drawing Sheets

FLUID STRAINER ASSEMBLY

BACKGROUND OF THE INVENTION

1. Field of the Invention

The present invention relates generally to devices for the removal and straining of suspended substances from fluids and, more particularly, to a fluid filtering and straining device for use with a fluid circulation system. Specifically, the present invention relates to a strainer and filtration assembly for use in filtering debris and other suspended substances from the water of a swimming pool or water fountain recirculation system.

2. Description of the Prior Art

There are numerous different types of fluid circulation systems used in a wide variety of applications including air or hydraulic fluid systems, swimming pool and water fountain recirculation systems, water irrigation delivery systems, and the like. All of these fluid circulation systems have several common elements. Such fluid circulation systems include some type of fluid reservoir or source and require that fluid be moved from the reservoir to an ultimate destination, which may include a return to the reservoir. Such fluid movement is generally accomplished using a vacuum pump system, and it is generally desirable and often required that the fluid from the reservoir first be filtered and/or strained before it is allowed to enter the vacuum pump to prevent clogging and damage to the pumping system. The fluid may be liquid, gel or gas.

U.S. Pat. No. 4,387,022 illustrates a filtering device for use in a hydraulic fluid system, while U.S. Pat. Nos. 4,045,351, 6,106,709 and U.S. Pat. No. 6,210,573 all disclose water filtration devices for a variety of different applications including, respectively, a bathroom or kitchen sink, an aquarium, and a washing machine. None of these devices are adapted to handle large volumes of fluid and the problems inherent with filtering and straining debris therefrom.

U.S. Pat. Nos. 4,430,214, 5,750,022, 5,888,386 and U.S. Pat. No. 6,080,324 all disclose filtration and strainer devices for use in removing debris from water recirculation systems in swimming pools. In particular, U.S. Pat. No. 4,430,214 discloses a device wherein the debris is shredded before entering the pump in order to promote ease of passage of the debris through the pump. The remaining three patents all disclose filtration devices wherein debris is captured by a porous net or plate in such a manner as to gradually restrict water flow therethrough due to the accumulation of debris on or in the filtering structure This accumulation of debris may cause a gradual change in the water pressure between the inlet and the outlet of the filtering device thereby increasing the workload of the vacuum pump over time. This situation can in turn cause a reduction in the filtration and recirculation efficiency for the swimming pool system and, if left uncorrected by removal of the debris from the filtering structure, may cause premature failure of the vacuum pump.

In addition to the above, many commercially available strainer pots for swimming pools or fountains have a high profile and limited capacity. As a result, they are dramatically oversized or are used in multiples of two which adds to both the cost as well as the maintenance of the overall system. Accordingly, there remains a need in the industry for a filtration and straining device which effectively filters debris from fluid of all types without substantial pressure changes within the device resulting from debris accumulation. Moreover, there remains a need for such a device which is compact in design, has a low profile and high-volume, is capable of in-line installation, and is easy to access for cleaning purposes.

SUMMARY OF THE INVENTION

Accordingly, it is one object of the present invention to provide an improved filtration and strainer device for fluids of all types.

It is another object of the present invention to provide a strainer and filtration assembly for a water circulation system.

Yet another object of the present invention is to provide an improved debris filtration system for a swimming pool recirculation system which is compact in design, easy to install, high in volume treatment, and is easy to access for cleaning.

Still another object of the present invention is to provide an in-line water filter and strainer device which effectively filters debris from fluid without substantial pressure changes within the device resulting from debris accumulation.

To achieve the foregoing and other objects and in accordance with the purpose of the present invention, as embodied and broadly described herein, a fluid strainer device is disclosed. The device includes a housing which defines an open chamber, the chamber having both a fluid input port and a fluid outlet port. A plurality of spaced strainer baskets are disposed within the chamber. Each basket has a pair of spaced perforated side panels, a perforated rear panel, a top panel and an open front portion in fluid communication with the chamber fluid input port. Finally, each strainer basket is aligned within the chamber for fluid flow from the chamber input port into the basket's open front portion and out through the perforations thereof to filter debris from the fluid while preventing substantial fluid pressure drop between the input and outlet ports substantially independent of debris buildup within the baskets.

In one application of the invention, the fluid strainer device further includes an open top portion in the housing and a removable cover element for covering the open top portion and selectively accessing the open chamber through the open top portion. The baskets are arranged adjacent each other and are selectively removable from the chamber for cleaning purposes. In such an instance, each basket preferably includes a perforated top and bottom panel. Moreover, the perforations of each basket are preferably defined by a plurality of offset fluid flow apertures in the side, top, rear and bottom panels of the basket.

In another application of the invention, each basket may include an open bottom panel permitting debris passage therethrough. In this instance, the chamber further includes a bottom portion beneath the basket open bottom panels for accumulating filtered debris therefrom. In this application of the invention, the housing further includes a debris exit port disposed in the chamber bottom portion below the water input port. A valve assembly is also provided for selectively closing the water input port and opening the debris exit port to create back flushing of water and accumulated debris through the chamber bottom portion out through the debris exit port. The housing may further include a water flow pressure sensor element and switch member disposed at the water outlet port for selectively operating the circulation pump and chamber water flow in response to changes in water flow pressure across the baskets resulting from accumulation of debris in the baskets.

In still another application of the invention, the baskets disposed in the chamber are arranged adjacent each other, and the strainer device further includes a fluid deflector plate disposed within the chamber between the open front portions of the baskets and the fluid input port. The plate has a plurality of slotted openings corresponding in size and shape with the open front portions of the adjacent baskets to direct and evenly distribute fluid flow from the inlet port into the baskets through the open front portions thereof. In a modification of this application, the strainer device further includes a plurality of spaced fluid flow vanes positioned between the fluid inlet port and the fluid deflector plate, the vanes being angularly oriented to deflect fluid through the slotted plate openings into the basket open front portions.

A further application of the invention includes a bulkhead plate covering the open top portion. The bulkhead plate preferably has a plurality of slotted openings defined therein which are sized to permit the baskets to pass therethrough and be removably positioned in the chamber. The bulkhead plate further includes a plurality of channel openings positioned downstream of the slotted openings to enhance fluid flow over the bulkhead plate. In this instance, each basket has a peripheral lip flange about its top panel for positioning the basket onto the bulkhead plate to secure the basket within the chamber. Additionally, the strainer device may further include an air elimination port extending from the housing above the fluid outlet port and communicating with the chamber above the bulkhead plate.

In yet another application of the invention, a strainer and filtration assembly is provided for a water circulation system. The circulation system includes a water reservoir, a water circulation pump, a water outlet conduit emanating from the reservoir and which is adapted to carry debris-laden water therefrom, and a water return conduit disposed downstream of the pump to direct debris-filtered water to selective destinations including back to the reservoir. The strainer and filtration assembly preferably includes a housing defining an open chamber. The chamber preferably has a water input port at a first end portion communicating with the water outlet conduit, and a water outlet port at a second end portion attachable to the water circulation pump. A removable cover element is preferably provided for selectively accessing the open chamber, and a plurality of spaced strainer baskets are arranged substantially adjacent to each other within the chamber. Each such basket preferably has a pair of spaced perforated side panels, a perforated rear panel, a perforated top panel and an open front portion disposed in fluid communication with the chamber water input port for receiving debris-laden water from the water outlet conduit. In preferred form, each strainer basket is aligned for water flow created by the pump and directed from the input port into the open front portion and out through the perforations thereof to filter debris from the incoming water while preventing any substantial pressure drop between the water input and water outlet ports substantially independent of filtered debris buildup in the baskets.

In still a further application of the invention, the present invention represents an improvement to a swimming pool water circulation and filtration system. The swimming pool system includes a swimming pool which functions as a water reservoir, a water circulation pump, a pool outlet conduit for removing debris-laden water from the pool, a strainer and filtration device for removing debris from the outlet conduit water prior to entering the pump, and a pool return conduit for redirecting the filtered water from the pump back to the pool. In this particular application of the invention, an improved strainer and filtration device is provided. The improved device includes a housing which defines an open chamber and has a water input port at a first end portion communicating with the swimming pool outlet conduit, and a water outlet port at a second end portion attached to the water circulation pump. The pump is arranged to pull the debris-laden water through the chamber. A plurality of spaced strainer baskets are disposed within the chamber. Preferably, each strainer basket has at least a pair of spaced perforated side panels, a perforated rear panel, a perforated top panel and an open front portion disposed in fluid communication with the water input port. The baskets are positioned for receiving debris-laden water from the swimming pool outlet conduit into each basket and out through the perforations thereof to filter debris from the water as it flows to the outlet port while preventing substantial water pressure drop within the device despite debris buildup.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings.

DETAILED DESCRIPTION OF THE PREFERRED EMBODIMENTS

Figure 1:
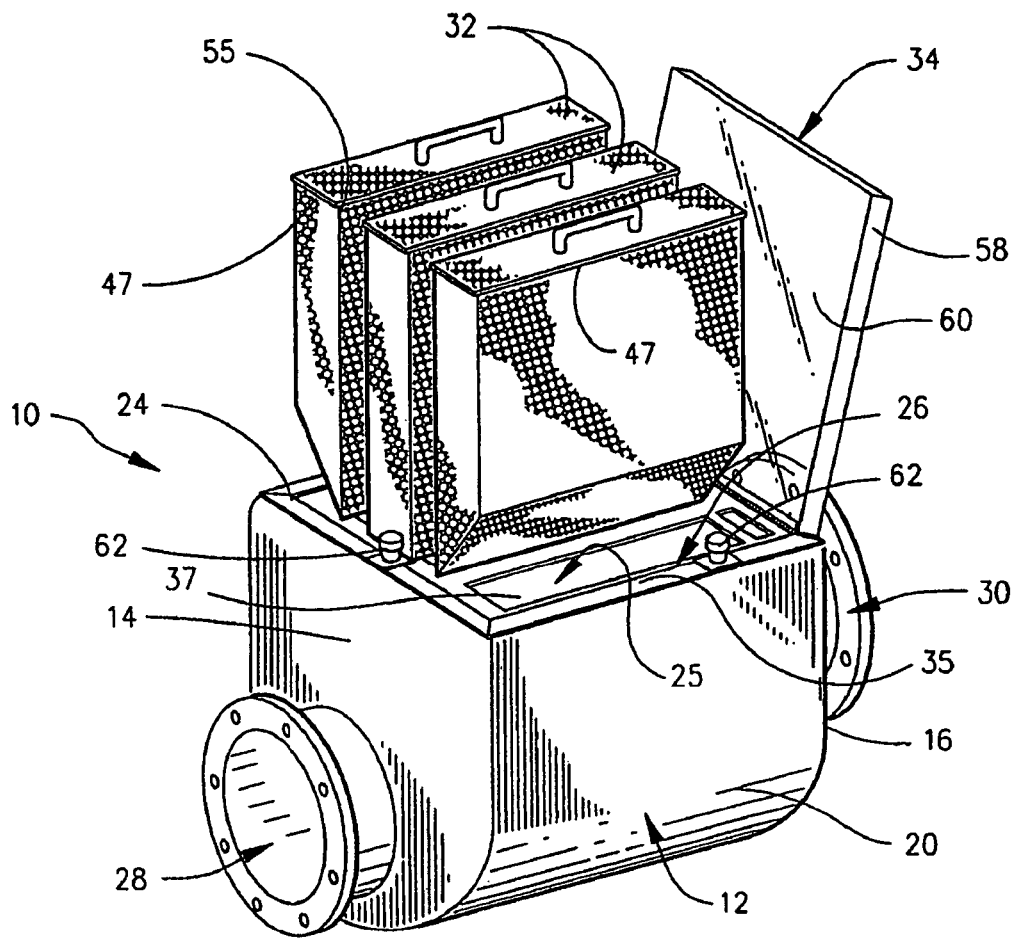
FIG. 1 is a front perspective view, with parts in elevation, of one embodiment of a fluid strainer device constructed in accordance with the present invention.
Figure 2:
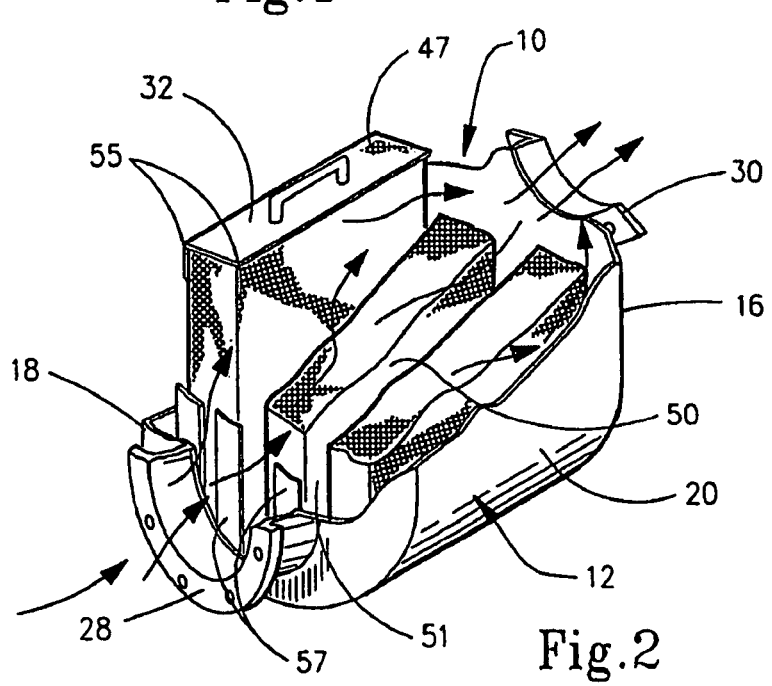
FIG. 2 is a front perspective view, with portions cut away, of the fluid strainer embodiment illustrated in FIG. 2.

The present invention is directed to a fluid strainer and filtering apparatus which allows for the simultaneous and uniformly even removal of debris from the fluid utilizing multiple straining baskets or collecting devices aligned and contained within a single housing structure. Referring with more particularity to FIGS. 1 and 2, a fluid strainer device 10 is illustrated as constructed in accordance with the present invention. It should be understood that while several specific preferred embodiments are illustrated and discussed in detail herein, the present invention is not to be so limited but rather must be interpreted within the scope of the appended claims. Moreover, it should be further understood that while the preferred embodiments are described using water as a filtered fluid, the present invention is applicable to filtering and straining debris from all types of fluids including liquids, gels and gases including air.

In one preferred form of the invention, the strainer device 10 includes a housing or casing 12 having a front inlet portion 14, a rear outlet portion 16, a pair of side portions 18, 20, a bottom portion 22 and an upper portion 24. The housing 12 includes an upper opening 25 and is adapted to define an interior chamber 26 therewithin. The chamber 26 communicates with the outside environment through opening 25. The front portion 14 preferably includes at least one fluid inlet port 28 while the rear portion 16 includes at least one fluid outlet port 30, the fluid flowing within the chamber 26 from the inlet port 28 to the outlet port 30. A plurality of fluid strainer baskets 32 are preferably positioned within the chamber 26. While it is preferred to utilize three or four baskets 32 within the chamber 26 as illustrated herein, it should be understood that the number and size of the baskets 32 might vary considerably depending upon the environment in which the device 10 is utilized. In one form of the invention, a removable cover element 34 is provided to cover and enclose the baskets 32 within the chamber 26 at the top portion 24. Moreover, a strainer basket bulkhead plate 35 is preferably positioned to cover the opening 25. The plate 35 includes slotted openings 37 sized to receive the baskets 32 and permit them to pass therethrough into the chamber 26.

Referring in more particular now to FIGS. 1-2 and 5-9, the illustrated device 10 is designed so that the plurality of baskets 32 may be removed from the chamber 26 through the slots 37 in the plate 35 for cleaning purposes. In this particular embodiment, each basket 32 includes a top panel 36, a pair of spaced apart side panels 38, 40, a rear panel 42, a bottom panel 44 and an open front portion 46. The top panel 36 preferably includes a lip flange 47 surrounding and projecting outwardly from the periphery thereof. The lip 47 functions as a stop to permit the basket 32 to rest on the surface of the plate 35 when the basket is dropped into the chamber 26 through the slotted openings 37 in the plate 35.

The top panel 36, each of the side panels 38, 40, the rear panel 42 and the bottom panel 44 are all preferably made of material which is corrosion resistant to the fluid utilized in the device 10, and is most preferably stainless steel. Moreover, they all preferably include a plurality of apertures or holes 48, although one or more of these panels may be in solid form if desired. In preferred form, the apertures 48 are offset from each other so as to increase the number of holes per panel. In one most preferred form, the apertures 48 are hexagonal-shaped holes to create a beehive-like structure with preferably no less than 79 percent open area. In this manner, the fluid entering the device 10 is filtered as it flows into the open front portion 46 of each basket and passes through the apertures 48, while debris carried by the fluid is retained against the interior surfaces of the panels within the basket 32.

In preferred form, each of the baskets 32 as described above is preferably a rectangular shaped enclosure. Each of the rectangular baskets 32 are preferably spaced from each other to create a plurality of open flow paths 50 in between the baskets 32 as well as on each outermost side portion of the outer baskets 32. A fluid deflector bulkhead or plate 51 is preferably positioned between the inlet port 28 and the open front end portions 46 of the baskets 32. The deflector plate 51 includes a plurality of slotted openings 52 which are preferably sized, shaped and positioned so as to align with, and preferably in a congruent manner, the front end portions 46 of the baskets 32 so as to deflect fluid entering the chamber 26 from the inlet port 28 into the baskets 32. In this manner, the fluid flow within the chamber 26 is directed from the inlet port 28 to the outlet port 30 along the lengths of the baskets 32.

In one preferred form, the plate 51 includes a plurality of first connector elements 53 disposed along the edges of the openings 52, while the front end portions 46 of the baskets 32 include a plurality of second connector elements 55 disposed along the front edges thereof. The first and second connector elements, 53, 55 respectively, are arranged to interconnect when the baskets 32 are positioned in the chamber 26. In this manner, the slotted openings 52 will always be aligned with the front end portions 46 to ensure proper fluid flow. In one preferred embodiment, the first connector elements 53 are in the form of grooved members, while the second connector elements 55 are in the form of tongue elements sized for sliding engagement within the grooved members 53.

To further assist in diverting the incoming fluid into the baskets 32, a plurality of elongated vanes 57 are preferably mounted within the housing 12. The vanes 57 are preferably spaced from each other and positioned between the inlet port 28 and the fluid deflector plate 51, most preferably in the neck or throat portion of the inlet port 28 itself. The vanes 57 are generally angled so that the incoming water passing through the inlet port 28 is diverted toward the slotted openings 52 of the deflector plate 51. While the vanes 57 are illustrated as being oriented vertically relative to the axis of the chamber 26, it should be understood that the vanes may also be oriented horizontally depending on the desired deflection effect.

The debris-laden water passes through the openings 52 and into the baskets 32 to impinge the rear panels 42 along with portions of the top panel 36, side panels 38, 40 and bottom panel 44 immediately proximate thereto. The debris is then filtered from the water and accumulates within the baskets 32, while the filtered fluid passes through the apertures 48 and into the flow paths 50 to the outlet port 30. The accumulation of debris within the baskets 32 starts at the rear panel portion 42 and moves toward the front open end portion 36. Consequently, as debris accumulates within the baskets 32, there are always open apertures 48 in the top, side and bottom panels 36, 38, 40 and 44 which enable the fluid to pass therethrough without restricting fluid flow. This arrangement prevents the fluid pressure within the chamber 26 from decreasing substantially during the course of debris accumulation within the baskets 32 until the baskets are completely full.

In the embodiment illustrated in FIGS. 1-2 and 5-9, the baskets 32 are designed to be physically removed from the chamber 26 for cleaning purposes. To accomplish this task, each basket 32 preferably includes a handle 54 disposed on the upper surface of the top portion 36 thereof. The handle 54 is utilized to physically remove the basket 32 from the housing chamber 26 through the opening 25 so that the accumulated debris therein may be flushed out to open all of the apertures 28 once again. This can be readily performed by using a pressurized water source such as from a garden hose. Once each basket 32 has been cleaned of all accumulated debris it is replaced within the housing chamber 26. The baskets 32 are withdrawn from the chamber 26 through the opening 25 in the top portion 24 of the housing 12. Once the baskets 32 have been cleaned and replaced within the chamber 36, the opening 25 is covered by the removable cover element 34 and sealed by utilizing a gasket 59 which surrounds the opening 25. In preferred form, the cover element 34 includes a hinge 56 positioned for selectively moving the cover element 34 relative to the opening 25, a circumferential rim 58 for engaging the sealing gasket 59 positioned about the housing upper portion 24, and a transparent center portion 60 which enables visual inspection of the chamber 26 at any time. The transparent center portion 60 permits one to determine when the baskets 32 are almost full.

Figure 7:
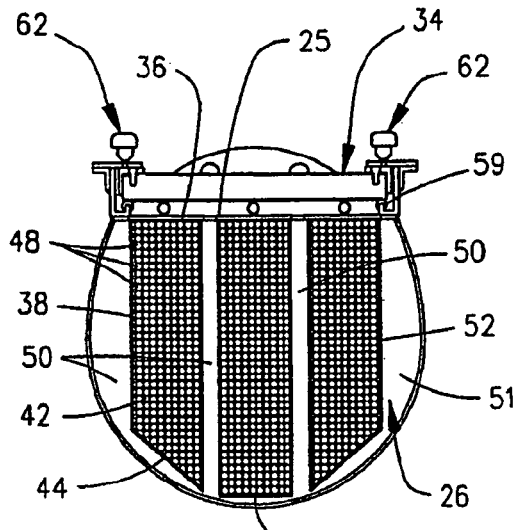
FIG. 7 is a cross-sectional view taken substantially along line 7-7 of FIG. 5.
Figure 5:
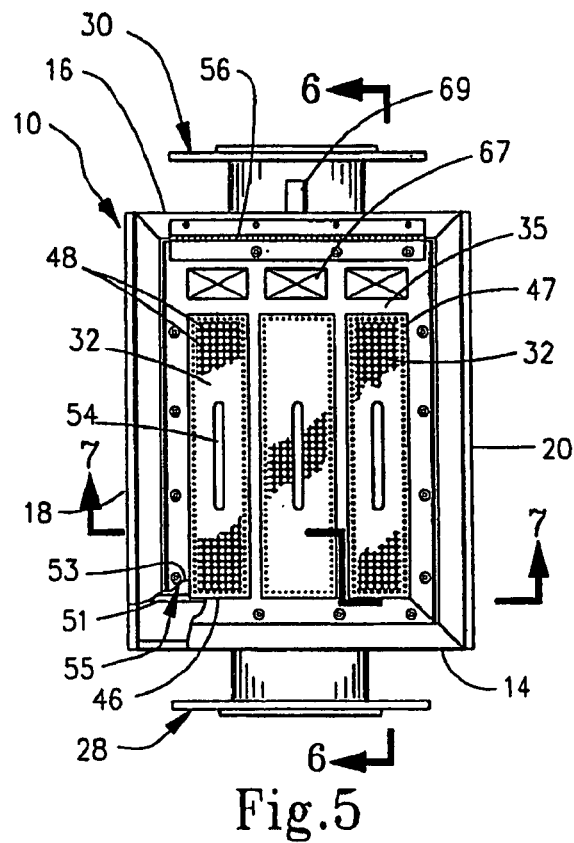
FIG. 5 is a top plan view of the fluid strainer device embodiment illustrated in FIGS. 1 and 2.
Figure 8:
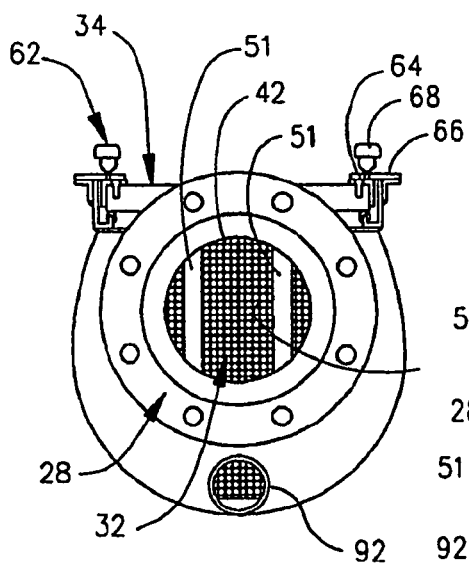
FIG. 8 is an end elevation view taken substantially along line 8-8 of FIG. 6.
Figure 6:
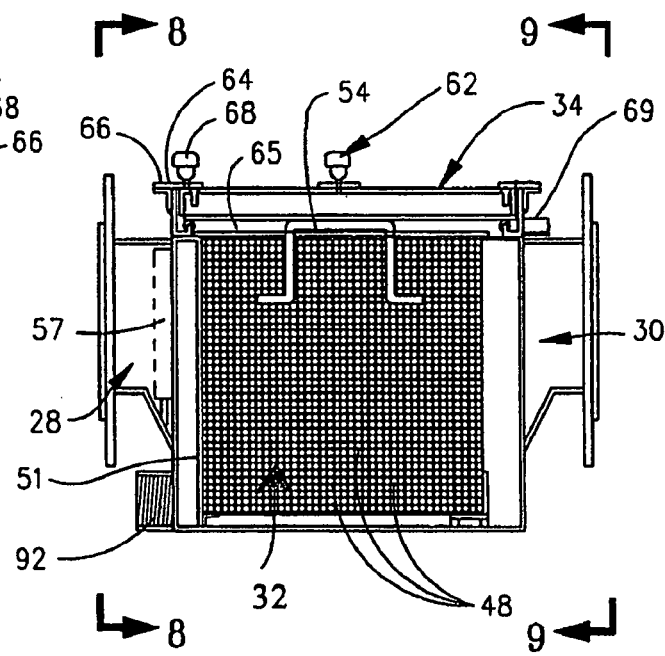
FIG. 6 is a cross-sectional view taken substantially along line 6-6 of FIG. 5.
Figure 9:
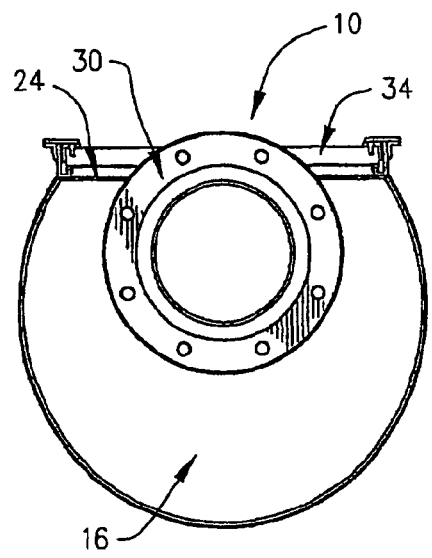
FIG. 9 is an end elevation view taken substantially along line 9-9 of FIG. 6.
Figure 10:
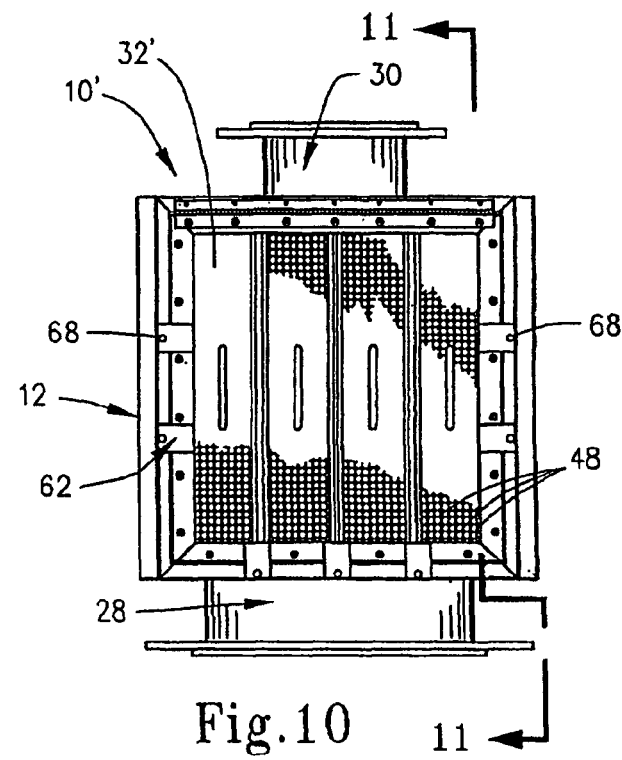
FIG. 10 is a top plan view of an alternate fluid strainer device embodiment constructed in accordance with the present invention.
Figure 12:
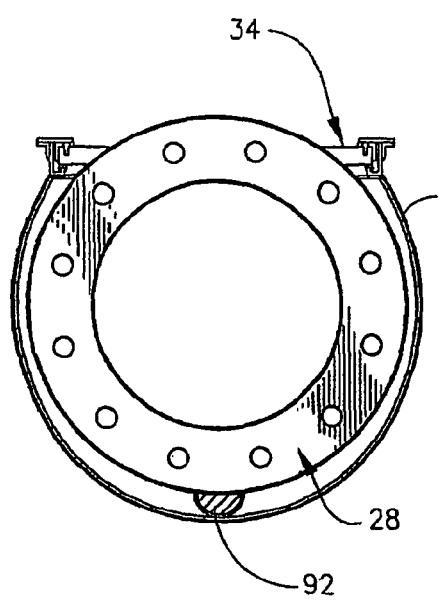
FIG. 12 is an end elevation view taken substantially along line 12-12 of FIG. 11.
Figure 11:
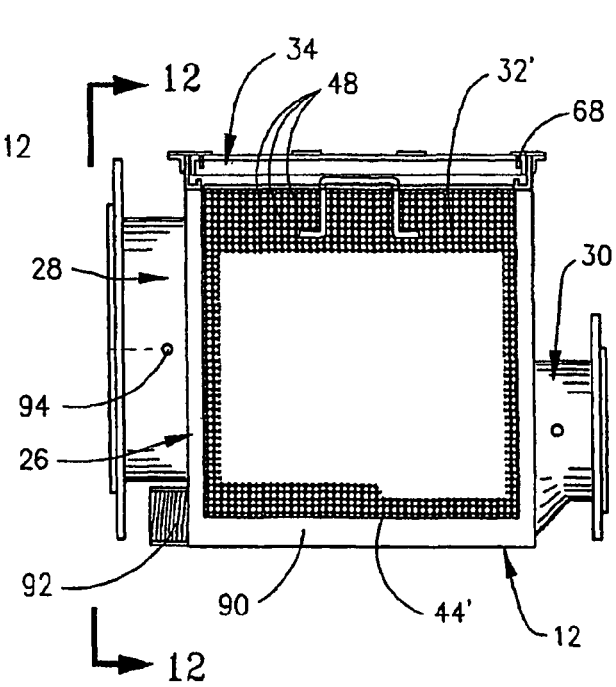
FIG. 11 is a cross-sectional view of the alternate fluid strainer embodiment taken substantially along line 11-11 of FIG. 10.

The removable cover 34 is preferably retained in place by a plurality of adjustable draw latches 62. In preferred form, each latch 62 includes a flange 64 and a hinge 66 for permitting the flange 64 to move between a closed position fixed against the rim 58, and an open position wherein the flange 64 is uncoupled from the rim 58. When the flange 64 is in its closed position as illustrated in FIGS. 6-8, a hand knob 68 adjustably tightens the flange 64 in position to hold the cover element 34 against the housing 12. The adjustable draw latches 62 provide precise pressure sealing using the adjustability of the knobs 68 without damaging the sealing gasket 59 positioned around the opening 25.

The upper surface of the top panel 36 of each basket 32 is generally spaced from the cover 34 when the cover 34 is in its closed position. In fact, the handles 54 may function as a spacer on which the cover 34 rests when the baskets 32 are in the chamber 26 and the cover 34 is in its closed position. This spacing 65 enables fluid to flow up through the apertures 48 in the top panel 36 and into the space 65 to filter the fluid. To assist in maintaining fluid flow within the space 65, a plurality of basket effluent evacuation ports 67 in the form of transversely orientated channels are provided in the plate 35 downstream of the slotted openings 37. Thus, fluid flows through the top panel 36 into space 65 to filter debris therefrom, across the surface of the plate 35 in the space 65, down through the ports or channels 67 into the rear of the chamber 26, and then out the exit port 30 along with the rest of the filtered fluid. In this manner, the top panel 36 can act in conjunction with the remaining perforated portions of the basket 32 to filter fluid without creating fluid back pressure within the device 10.

Figure 3:
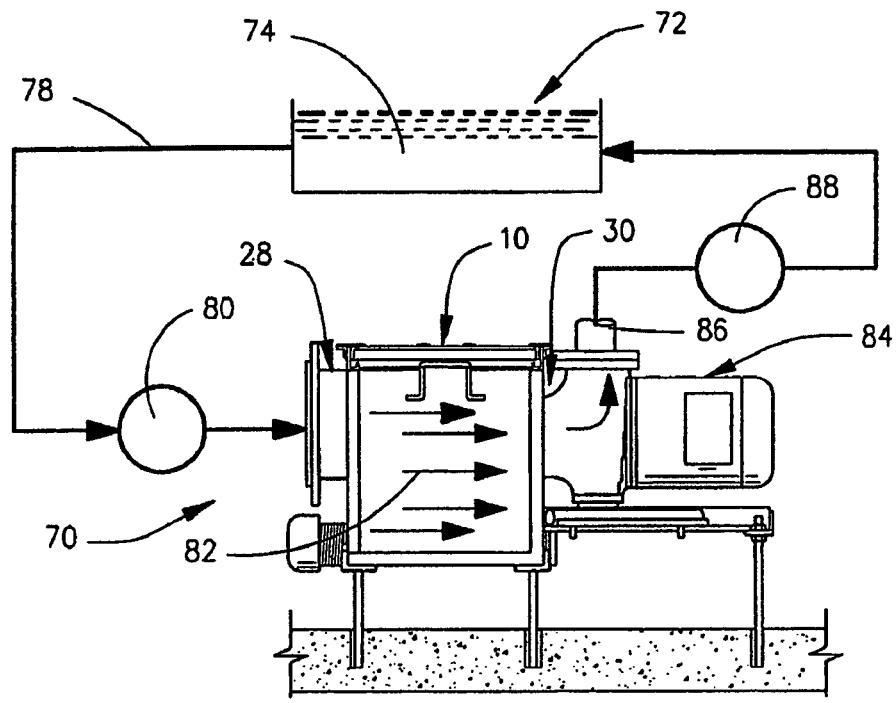
FIG. 3 is a schematic illustrating a water recirculation system incorporating the fluid strainer embodiment of FIGS. 1 and 2 therein.
Figure 4:
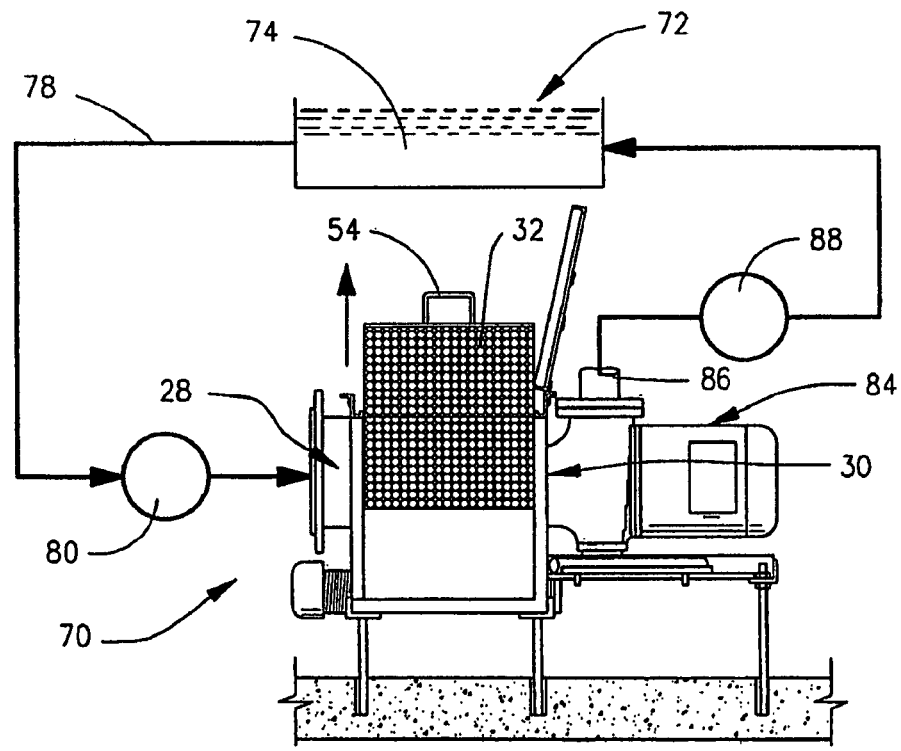
FIG. 4 is a schematic similar to that of FIG. 3 but illustrating removal of the filtration baskets from the fluid strainer embodiment for cleaning thereof.

At times, air may drawn into the inlet port 28 along with liquid influent such as water. Such air can then pass through the device 10 and into the vacuum pump 84 (see FIGS. 3-4) to cause cavitation therein. Such cavitation can not only be a nuisance but may also cause damage to the pump. To prevent this from occurring, an automatic air elimination system is preferably provided. In preferred form, the system includes a small evacuation port 69 positioned immediately above the fluid exit port 30. The port 69 preferably communicates with the space 65 to receive any air passing therein from the inlet port 28, since air will tend to rise and pass from the basket 32 through the top panel 36 into the space 65. The air is diverted through the port 69 and is then generally directed to a return ducting such as at 86 (FIGS. 3-4). This arrangement prevents air cavitation within the vacuum pump thereby preventing loss of pump efficiency and damage.

Referring now to FIGS. 3 and 4, a swimming pool recirculation system 70 is illustrated and incorporates the fluid filtration and strainer device 10 as previously described. While a swimming pool environment is particularly illustrated herein, it should be understood that the system 70 is equally applicable to both swimming pools and water fountains since both applications require debris removal from water sources and then redirection of the filtered water back to the water source. In preferred form, the system 70 includes a swimming pool 72 which contains a reservoir of water 74. Such swimming pools typically capture a wide variety of debris such as human hair, leaves, dirt and other items. For cleanliness and safety purposes, the water 74 must periodically be chemically treated. Moreover, the debris must be removed. Therefore, the recirculation system 70 provides for removing the water 74 from the swimming pool 72, filtering it and then returning it back to the swimming pool 72.

The recirculation system 70 includes a water outlet conduit 78 which directs water 74 from the pool 72 to the inlet port 28 of the device 10. A first isolation valve 80 is preferably provided in the water outlet conduit 78 so that the device 10 can be taken offline for maintenance or cleaning purposes as discussed in more detail below. The water 74 is directed from the swimming pool 72 through the outlet conduit 78 to the inlet port 28 of the device 10. The water then passes through the device 10 and is filtered by the baskets 32 as described above. The arrows 82 illustrate the water flow through the device 10. The filtered water than exits the device 10 at the outlet port 30 and passes through a vacuum pump 84. The vacuum pump 84 is what creates the water flow through the recirculation system 70 and is of standard design. The water then exits the pump 84 through a water return conduit 86 and is delivered to the swimming pool 72. Any air diverted through the evacuation port 69 as described above is also preferably directed to the conduit 86. A second isolation valve 88 is provided in the return conduit 86 and may be utilized in conjunction with the first isolation valve 80 to permit maintenance and cleaning to take place on the device 10.

As previously described, the water pressure between the inlet port 28 and the outlet port 30 of the device 10 does not vary substantially while the baskets 32 are being filled with accumulated debris. This is a result of the design of the baskets 32 as previously described in detail. When the baskets 32 are completely full, however, the pump vacuum increases to a predetermined limit that indicates that the baskets 32 need to be cleaned. This may also be confirmed visually through the transparent portion 60 of the cover 34. The pump 84 preferably includes an effluent vacuum gauge of standard design (not illustrated) for this purpose.

Once this predetermined limit is achieved, which may be varied as desired, the pump 84 is turned off. At this point as particularly illustrated in FIG. 4, the isolation valves 80 and 88 are closed, and the cover 34 is opened to permit removal of the baskets 32. The baskets 32 then may be washed clean simply with a hose and replaced within the chamber 26. The lid 34 is then closed and secured using the latches 62, and the isolation valves 80 and 88 are opened. After this operation, the pump 84 is then turned back on so that the recirculation system 70 may continue to operate as previously described. As a result of this arrangement, debris-laden water is not be pulled through the pump 84 inadvertently while cleaning.

Alternatively, the recirculation system 70 can be adapted for removing water 74 from a reservoir other than a swimming pool. For example, the system 70 may be utilized to remove water from a reservoir such as a lake or river for the purpose of directing it to crop irrigation canals or storage tanks for human consumption. Regardless of the ultimate purpose or destination for the water or any other fluid for that matter, it still must be filtered of debris prior to entering a pump for ultimate disposition to any desired task. Thus, the filtration and strainer device 10 of the present invention may be utilized in any of these or other fluid delivery systems wherein the fluid needs to be filtered as a result of debris entering the original fluid pool or reservoir.

Referring now to FIGS. 9-12, an alternative embodiment of the present invention is illustrated. It should be understood that like parts are designated by like numerals throughout all of the figures. In this particular embodiment, the device 10' includes a housing 12 which defines an interior chamber 26 and includes an inlet port 28 and an outlet port 30. A cover 34 is attached to the top portion 24 of the housing 12. The cover 34 is designed as in the previous embodiment for selective ease of removal to permit access to the baskets within the chamber 26.

A plurality, and in this illustrated embodiment four, strainer baskets 32' are arranged within the chamber 26. The baskets 32' are sized and structured similar to the baskets 32 of the prior embodiment with one primary exception. In this particular embodiment, the bottom panel 44' is a large open channel and does not include any individual filtration apertures as in the prior embodiment. As a result, the debris which is filtered by the baskets 32' and accumulates therein may fall through the open bottom panel 44' to accumulate in the bottom portion 90 of the chamber 26.

The housing 12 preferably includes a debris exit port 92 communicating with the chamber 26 at the bottom portion 90 thereof. In preferred form, the debris exit port 92 is positioned below the inlet port 28. In this particular embodiment, the debris which accumulates within the baskets 32' is not disposed of by physically removing the baskets 32' from the chamber 26, although this procedure is capable of being performed. In preferred form, however, the accumulated debris is removed by back flushing the baskets 32'. This is accomplished by providing a unidirectional check valve 94 prior to or within the inlet port 28 which permits the unidirectional flow of fluid through the inlet port 28 into the chamber 26 and prevents reverse flow therethrough. When the baskets 32' fill up to a preestablished fluid pressure or vacuum setting on the pump, as described in greater detail below, the pump is turned off. At this point, the exit valve 92 is opened which allows the water within as well as upstream from the chamber 26 to run through the baskets 32' backwards to push the debris off of the strainer baskets 32' and out the exit valve 92. Once this is accomplished, the exit valve 92 is closed and the pump is again started.

Figure 13:
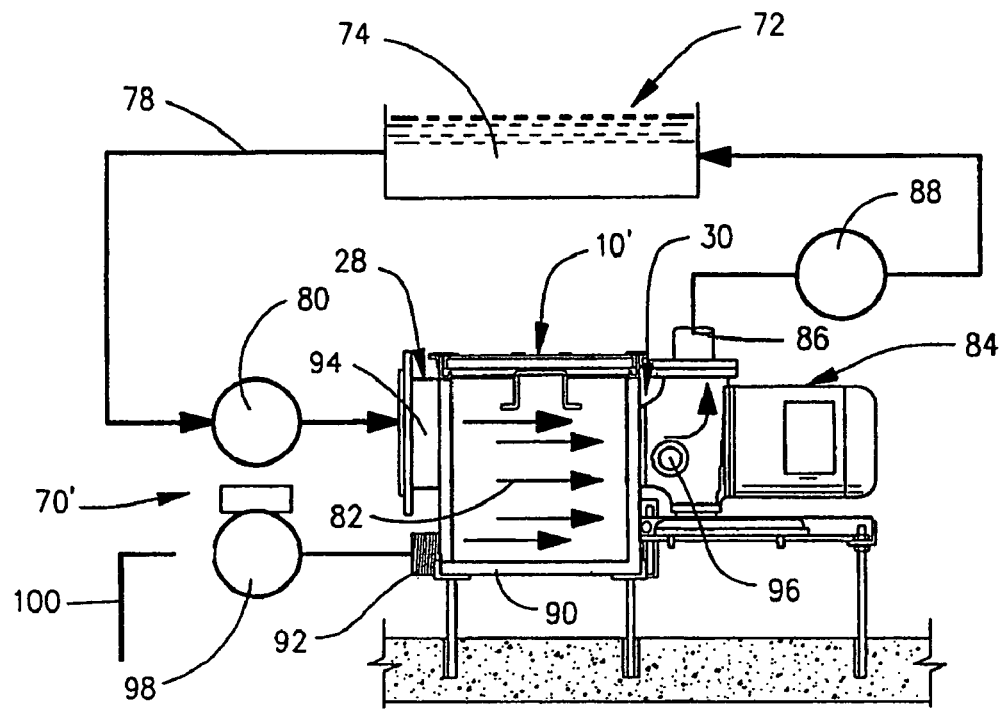
FIG. 13 is a schematic illustrating a water recirculation system incorporating the alternate fluid strainer device embodiment of FIG. 10 therein.
Figure 14:
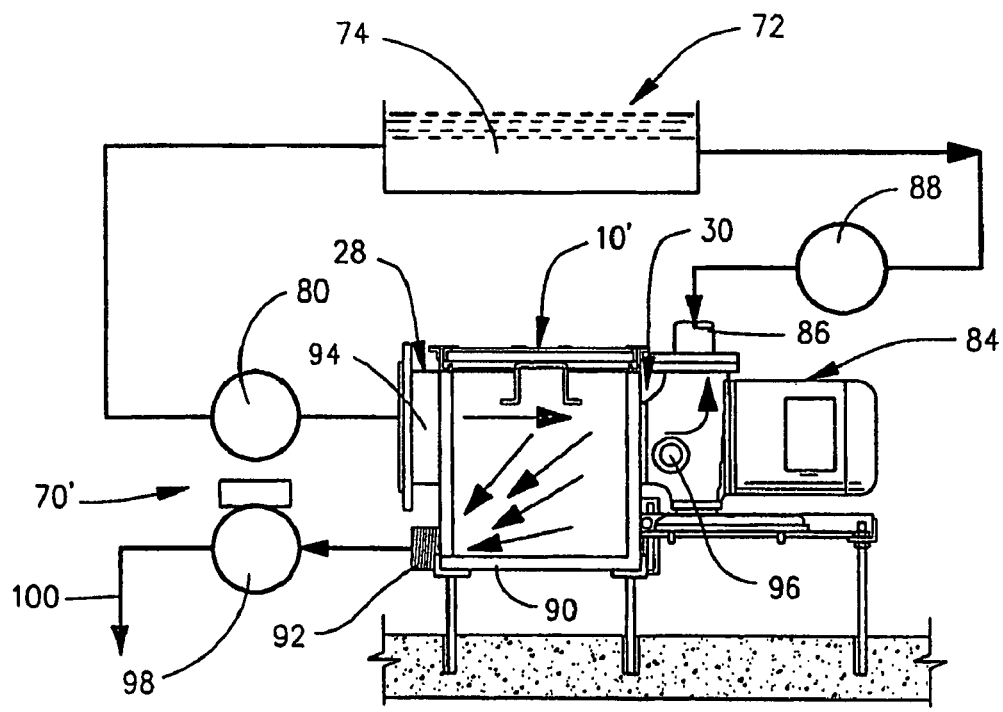
FIG. 14 is a schematic similar to that of FIG. 13 but illustrating removal of the filtered debris from the fluid strainer device embodiment by back flushing thereof.

Referring now to FIGS. 13 and 14, a swimming pool recirculation system 70' is illustrated. In this system 70', the water circulation and filtration process is illustrated in FIG. 13 and operates similar to the system illustrated in FIG. 3. However, in this particular system 70', the vacuum pump 84 includes a pressure sensor element and switch member 96 preferably in the form of a Mercoid switch. The switch 96 senses the water pressure at the outlet port 30 in the form of the amount of vacuum created by the pump 84. Thus, when the baskets 32' fill up to a preestablished vacuum setting on the Mercoid switch 96, the pump 84 is automatically turned off. The system 70' also includes an auto valve 98 which controls operation of the exit port 92. When the pump 84 is turned off by the Mercoid switch 96, the auto valve 98 opens the debris exit port 92 after a brief time delay. This permits accumulated water within the chamber 26 as well as in the conduit 86 upstream from the chamber 26 to be back flushed through the baskets 32' and sweep the accumulated debris out the exit port 92 through a discharge conduit 100.

In preferred form, this back flush procedure is an adjustable timed event after which the auto valve 98 closes the debris exit port 92 and signals the pump 84 to begin operation. If the strainer baskets 32' have been cleaned an appropriate amount, the vacuum setting at the Mercoid switch 96 will confirm that this is the case and allow the pump 84 to run in normal mode until such time that the baskets 32' need to be cleaned again. It should be understood that the system 70' may be used in a wide variety of applications similar to those outlined above for the recirculation system 70, such as the removal of water from a reservoir such as a lake or river for the purpose of directing it to crop irrigation canals or storage tanks for human consumption as well as for water treatment from mining, storm water, pulp water and other fluid processes.

Figure 15:
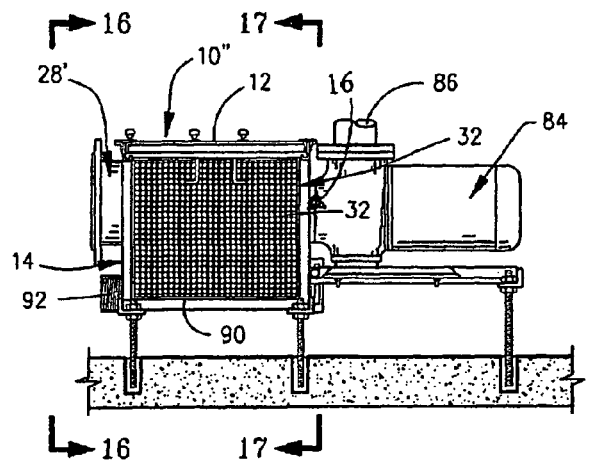
FIG. 15 is a side elevation of yet another embodiment of the fluid strainer device constructed in accordance with the present invention and adapted for connection to two water pumps.
Figure 16:
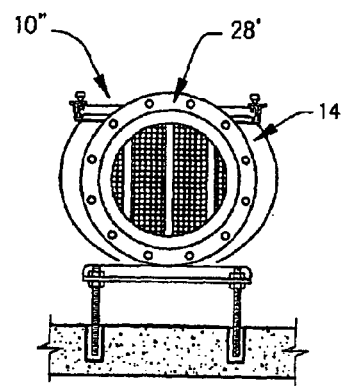
FIG. 16 is an end elevation taken substantially along line 16-16 of FIG. 15.
Figure 17:
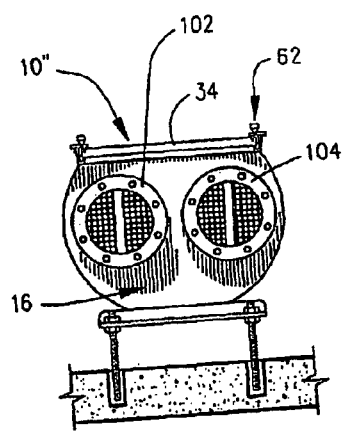
FIG. 17 is a sectional view taken substantially along line 17-17 of FIG. 15 and illustrating an end elevation of the strainer device thereof which device has a plurality of outlet ports.

Referring now to FIGS. 15-17, another embodiment of the present invention is illustrated. In this particular embodiment, the filtration and strainer device 10" may include removable cover 34 with baskets 32 for removing accumulated debris therefrom, or it may include baskets 32' with a back flush system all as previously described. Separate inlet and outlet face piping ports are directly attached to the device 10" in close proximity to the strainer housing 12. In this particular embodiment, however, the housing 12 preferably includes an enlarged input port 28 adapted for a large water flow capacity. The rear end portion 16 of the housing 12 includes multiple and specifically at least a pair of outlet ports 102, 104 in lieu of a single outlet port 30 as illustrated in the prior embodiments. The outlet ports 102,104 are adapted for attachment to an equivalent number, and in this illustration a pair, of pumps 84. This embodiment allows for two different flow rates to be provided to two water features that share a common body of water.

This embodiment also permits the connecting of multiple pumps to the same fluid and strainer device 10" for water fountains and water features that share common water as well as provides energy efficient pump sizing for separate water features. The embodiment also doubles the flow rate to handle larger pools or bodies of water. Moreover, it permits one to stagger start the multiple pumps to prevent pool or water feature down time. Additionally, each pump may be sized to meet half the flow requirement so that only one pump may be run during off-peak periods for additional energy conservation and reduced operating cost.

Figure 18:
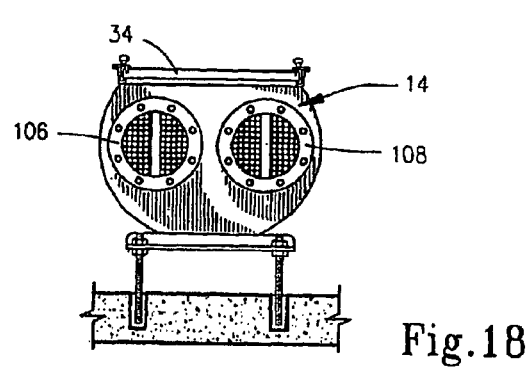
FIG. 18 is an end elevation of a modification of the embodiment of the fluid strainer device of FIG. 15 illustrating such a device having a plurality of inlet ports.

A modification to the above embodiment is illustrated in FIG. 18. In this particular embodiment modification, multiple inlet ports, and in this embodiment a pair of inlet ports 106, 108, may be utilized in lieu of the single inlet port 28 as previously illustrated. Such a multiple inlet port embodiment allows for fluid to be removed from different locations of a pond, pool, reservoir or other fluid source. This in turn would allow one to provide more selective cleaning of the body of fluid from areas that tend to produce higher levels of debris. Moreover, by further valving the multiple inlet ports 106, 108, a different rate of straining and filtering can be achieved.

As can be seen from the above, the present invention provides a highly efficient fluid filtration and strainer device for use in a wide variety of the fluid circulation or recirculation systems. In swimming pool systems, large debris such as leaves, cotton buds, dust, dirt and most other airborne matter finds its way to the surface of the water and needs to be removed from the water prior to entering the pump system. Most commercially available strainer pots have a high profile and limited capacity so that they are dramatically oversized and are used in multiples of two or more, which adds cost and increases maintenance to the system. The present invention, on the other hand, has a pipe-to-basket ratio as high as 94:1, which in turn provides a holding capacity of over 400% greater than competitive devices. The low-profile and pump mounting system of the present invention allows it to be installed onto a pipe section with virtually perfect alignment as well as provides full weight support of the pump volute to eliminate excessive stress. The present invention is designed to provide auto air elimination which improves pump performance. Moreover, it helps prevent pump cavitation and the associated noise and vibration which contributes to premature pump fatigue or failure.

The present invention also provides a device with a low pressure drop as it filters debris as well as a low profile with adjustable pipe and pump alignment. The present invention improves pump performance on a fluid recirculation system thereby saving on operating costs. It provides a clog-free bypass design with easy-to-remove multiple strainer baskets. Moreover, a transparent hinged cover is provided for easy access to the strainer baskets. The present invention has three to four times the holding capacity of other bulky type strainer pots in the art. Finally, the present invention provides a filtration and strainer device which, in one embodiment, is capable of self-cleaning thereby eliminating the human element when addressing cleaning and removal of the filtered debris from the strainer device.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A fluid strainer apparatus adapted to remove debris from a stream of fluid, the apparatus comprising:
   (A) a housing including a front portion, a back portion, a pair of spaced apart side portions, a bottom portion and a top portion defining a chamber, said front portion having at least one fluid input port and said back portion having at least one fluid outlet port for flowing the stream of fluid through said housing;
   (B) a fluid deflector bulkhead plate extending transversely across said chamber between said side portions proximately to said front portion and having a plurality of first slotted openings formed therein; and
   (C) a plurality of strainer baskets adapted to be disposed side-by-side within said chamber and supported therein in a mounted state, each said strainer basket including
      (1) a top portion, a bottom portion, a back portion, spaced-apart side portions extending from proximal the top portion of the chamber to proximal the bottom portion of the chamber, and an open front portion, wherein
      (2) at least one of said top portion, said bottom portion, said back portion and said side portions is perforated,
   wherein each said strainer basket, when supported in the mounted state, has the open front portion thereof aligned with a respective first slotted opening; and
   wherein the first slotted openings and the open front portions of the mounted strainer baskets together extend across substantially the entirety of the cross-sectional area of said fluid input port such that said fluid deflector plate directs the fluid stream that enters the fluid inlet port into the open front portions of said strainer baskets, and substantially all of the stream of fluid enters said strainer baskets and exits through perforated ones of said top portion, said bottom portion, said back portion and said side portions and thereafter flows out of the fluid outlet port.

2. A fluid strainer apparatus according to claim 1 including a second
   bulkhead plate extending between said side portions in a plane generally perpendicular to said fluid deflector bulkhead plate and located proximately to the upper opening and having a plurality of second slotted openings formed therein, each of said strainer baskets sized and adapted to extend through a respective second slotted opening so as to be supported by said second bulkhead plate.

3. A fluid strainer apparatus according to claim 2 wherein each of said strainer baskets includes a pair of spaced perforated side panels, a perforated rear panel and a perforated top panel.

4. A fluid strainer apparatus according to claim 3 wherein, when said strainer baskets are in the mounted state, the side panels of said strainer baskets are spaced apart from one another and from the side portions of said housing, the top panels of said strainer baskets are spaced apart from said top portion of said housing and the bottom panel of said strainer baskets are spaced apart from the bottom portion of said housing to create fluid flow regions therebetween.

5. A fluid strainer apparatus according to claim 1 wherein said fluid deflector bulkhead plate further includes first connector elements disposed thereon and wherein said strainer baskets include second connector elements disposed on the front open portions thereof for selective engagement with said first connector elements to secure said strainer baskets to said fluid deflector bulkhead plate.

6. A fluid strainer apparatus according to claim 1 including a plurality of spaced fluid flow vanes disposed between said fluid inlet port and said fluid deflector bulkhead plate and angularly oriented to deflect fluid toward the first slotted openings and into the open front portions of said strainer baskets.

7. A fluid strainer apparatus according to claim 1 including an air elimination port extending from said housing above said fluid outlet port.

8. A fluid strainer apparatus according to claim 1 wherein said housing further includes a debris exit port disposed in said bottom portion thereof proximate to said input port and a check valve associated with said input port and operative to prevent fluid from exiting the housing through the inlet port.

9. A fluid strainer apparatus according to claim 1 wherein each said basket includes an opening in the bottom thereof for permitting debris passage therethrough, and wherein said chamber further includes a bottom region beneath each said baskets panels for accumulating filtered debris therefrom.

10. A fluid strainer apparatus according to claim 9 wherein said housing further includes a debris exit port disposed in said chamber bottom portion, and a valve assembly for selectively closing debris-laden water flow from said outlet conduit into said chamber while opening said debris exit port in response to selective back flushing of water and accumulated debris in the bottom region out through said debris exit port.

11. A fluid strainer apparatus adapted to remove debris from a stream of fluid, comprising:
   (A) a housing including a front portion, a back portion, a pair of spaced apart side portions, a bottom portion and a top portion defining a chamber with an upper opening therefore and a cross-section area, said front portion having an upstream fluid input port and said back portion having a downstream fluid outlet port whereby fluid may flow through said housing in a flow direction from the fluid input port to the fluid outlet port;

(B) a plurality of rectangular strainer baskets each including a perforated top panel extending from proximal the front portion of the chamber to proximal the back portion of the chamber, a perforated bottom panel extending from proximal the front portion of the chamber to proximal the back portion of the chamber, a perforated back panel extending from proximal the to portion of the chamber to proximal the bottom portion of the chamber, perforated spaced apart side panels extending from proximal the top portion of the chamber to proximal the bottom portion of the chamber and an open front, said strainer baskets adapted to be removably disposed within said chamber and supported in a side-by-side arrangement to define a mounted state with the open fronts oriented transversely to the flow direction, and, when said strainer baskets are in the mounted state, said strainer baskets being positioned such that the side panels are spaced apart from one another and from the side portions of said housing, the top panels of said strainer baskets are spaced apart from said cover member and the bottom panel of said strainer baskets are spaced apart from the bottom portion of said housing to create fluid flow regions therebetween, said strainer baskets being sized such that, when in the mounted state, the open fronts thereof together extend across a majority of the cross-section area of said chamber whereby substantially all of the stream of fluid enters the open fronts of said strainer baskets; and (D) a cover member adapted to be secured to said housing so as to extend across the upper opening.

12. A fluid strainer apparatus according to claim 11 including a fluid deflector bulkhead plate extending transversely across said chamber between said side portions proximately to said front portion and having a plurality of first slotted openings formed therein and a plurality of spaced fluid flow vanes disposed between said fluid inlet port and said fluid deflector bulkhead plate and angularly oriented to deflect fluid toward the first slotted openings and into the open front portions of said strainer baskets.

13. A fluid strainer apparatus according to claim 11 including an air elimination port extending from said housing above said fluid outlet port.

14. A water circulation system, comprising:
(A) at least one water reservoir;
(B) a first water outlet conduit emanating from said reservoir and adapted to carry debris-laden water therefrom;
(C) a water circulation pump for creating water flow through said system;
(D) a first water return conduit disposed downstream of said pump to direct debris-filtered water to a selective destination; and
(E) a water filtration apparatus operative to receive debris-laden water from said first water outlet conduit and directing filtered water to said pump, said filtration device including
(1) a housing including a front portion, a back portion, a pair of spaced apart side portions, a bottom portion and a top portion defining a chamber with an upper opening therefor, said front portion having at least one fluid input port in fluid communication with said first water outlet conduit and said back portion having at least one fluid outlet port, said water circulation pump mounted to said housing in fluid communication with said fluid outlet port whereby the stream of fluid may flow through said housing, (2) a fluid deflector bulkhead plate extending transversely across said chamber between said side portions proximately to said front portion and having a plurality of first slotted openings formed therein,
(3) a plurality of strainer baskets adapted to be disposed side-by-side within said chamber and supported therein in a mounted state, each said strainer basket including
(a) a top portion, a bottom portion, a back portion, spaced-apart side portions extending from proximal the top portion of the chamber to proximal the bottom portion of the chamber, and an open front portion, wherein
(b) at least one of said top portion, said bottom portion, said back portion and said side portions is perforated,
wherein each said strainer basket when, when supported in the mounted state, has the open front portion thereof aligned with a respective first slotted opening; and
wherein the first slotted openings and the open front portions of the mounted strainer baskets together extends across substantially the entirety of the cross-sectional area of said fluid input port such that said fluid deflector plate directs the fluid stream that enters the fluid inlet port into the open front portions of said strainer baskets and substantially all of the stream of fluid enters said strainer baskets and exits through perforated ones of said top portion, said bottom portion, said back portion and said side portions and thereafter flows out of the fluid outlet port.

15. A water circulation system according to claim 14 wherein said housing includes a second bulkhead plate extending between said side portions in a plane generally perpendicular to said fluid deflector bulkhead plate and located proximately to the upper opening and having a plurality of second slotted openings formed therein, each of said strainer baskets sized and adapted to extend through a respective second slotted opening so as to be supported by said second bulkhead plate.

16. A water circulation system according to claim 15 wherein each of said strainer baskets includes a pair of spaced perforated side panels, a perforated rear panel and a perforated top panel.

17. A water circulation system according to claim 16 wherein, when said strainer baskets are in the mounted state, the side panels of said strainer baskets are spaced apart from one another and from the side portions of said housing, the top panels of said strainer baskets are spaced apart from said top portion and the bottom panel of said strainer baskets are spaced apart from the bottom portion of said housing to create fluid flow regions therebetween.

18. A water circulation system according to claim 15 wherein the top portion of each said strainer basket includes a flange extending outwardly therefrom and adapted to confront said second bulkhead plate.

19. A water circulation system according to claim 14 wherein said fluid deflector bulkhead plate further includes first connector elements disposed thereon and wherein said strainer baskets include second connector elements disposed the front open portions thereof for selective engagement with said first connector elements to secure said strainer baskets to said fluid deflector bulkhead plate.

20. A water circulation system according to claim 14 including a plurality of spaced fluid flow vanes disposed between said fluid inlet port and said fluid deflector bulkhead plate and angularly oriented to deflect fluid toward the first slotted openings and into the open front portions of said strainer baskets.

21. A fluid strainer apparatus according to claim 2 wherein said second bulkhead plate includes a plurality of ports located downstream of said second slotted openings.

22. A fluid strainer apparatus according to claim 2 wherein the top panel of each said strainer basket includes a flange extending outwardly therefrom and adapted to confront said second bulkhead plate.

23. A fluid strainer apparatus according to claim 22 wherein the top panel of each said strainer basket includes a handle disposed thereon.

24. A fluid strainer apparatus according to claim 1 including a plurality of fluid inlet ports.

25. A fluid strainer apparatus according to claim 1 including a plurality of fluid outlet ports.

26. A fluid strainer apparatus according to claim 1 wherein said top portion of said housing is removable.

27. A fluid strainer apparatus according to claim 1, wherein said top portion of said housing is hinged to be openable.

28. A fluid strainer apparatus according to claim 1, wherein said top portion of said housing includes a transparent portion.

29. A fluid strainer apparatus according to claim 11 including a plurality of fluid inlet ports.

30. A fluid strainer apparatus according to claim 11 including a plurality of fluid outlet ports.

31. A fluid strainer apparatus according to claim 11 wherein said cover member includes a transparent portion.

32. A fluid strainer apparatus according to claim 11, further comprising a seal gasket extending around the upper opening of said housing;
   wherein the cover member is removably secured to said housing so as to seal against said seal gasket thereby to selectively enclose the chamber.

33. A fluid strainer apparatus according to claim 11, wherein said cover member is removable.

34. A fluid strainer apparatus according to claim 11, wherein said cover member is hinged to be openable.

35. A water circulation system according to claim 14, further comprising a cover member adapted to be secured to said housing so as to enclose the chamber.

36. A fluid strainer apparatus according to claim 35 wherein said cover member includes a transparent portion.

37. A fluid strainer apparatus according to claim 35, wherein said cover member is removable.

38. A fluid strainer apparatus according to claim 35, wherein said cover member is hinged to be openable.

* * * * *